June 11, 1968   S. E. COBLITZ   3,387,513
CHAIN-TOOL
Filed July 17, 1967
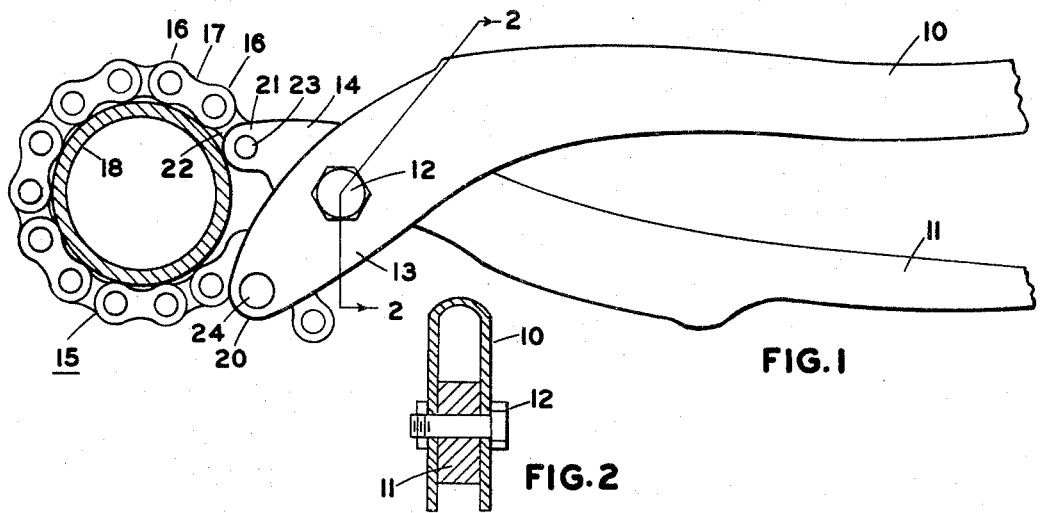
FIG. 1
FIG. 2
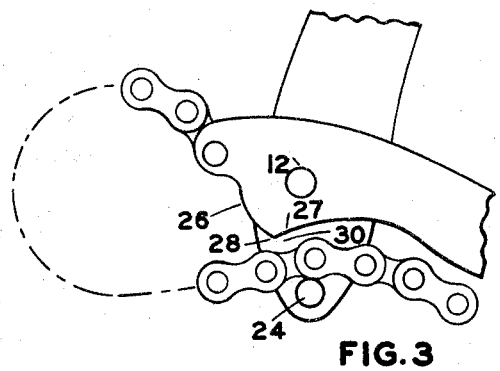
FIG. 3
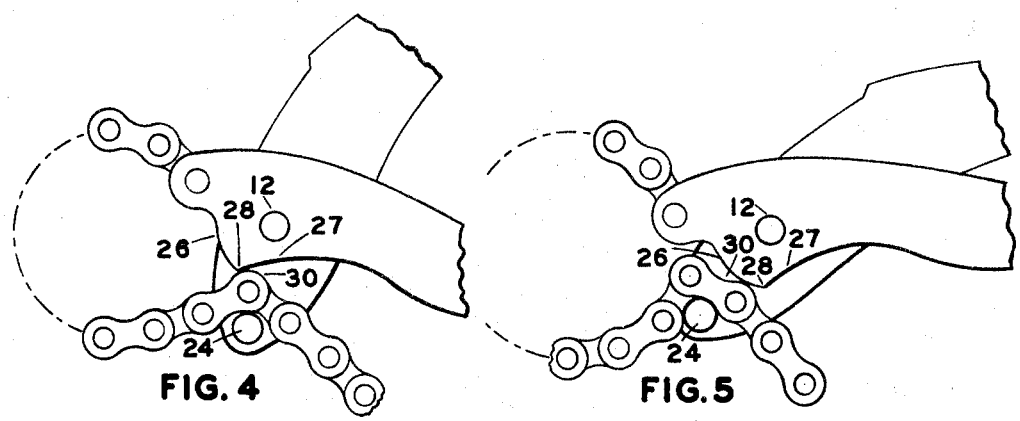
FIG. 4   FIG. 5
INVENTOR.
SANFORD E. COBLITZ
BY
*Woodling, Krost, Granger and Rust*
attys.

United States Patent Office 3,387,513
Patented June 11, 1968

3,387,513
CHAIN-TOOL
Sanford E. Coblitz, 567 Knollwood Ave.,
Ashtabula, Ohio 44004
Filed July 17, 1967, Ser. No. 653,916
5 Claims. (Cl. 81—66)

ABSTRACT OF THE DISCLOSURE

The device features a chain-tool disposed to hold a chain wrapped around an object to be squeezed. The chain-tool features a variable chain-receiving opening. The chain-tool includes a pair of jaws having an open-position range and a closed-position range. In the open-position range, the jaws increase the size of chain-receiving opening to an enlarged dimension through which the chain may be freely drawn, whereby the effective length of the chain wrapped around the object may be adjusted to take-up chain slack. In the closed-position range, the jaws restrict the size of the chain-receiving opening for holding the chain therein, whereby further closing of the jaws through said closed-position range squeeze-draws said chain about said object.

---

This invention relates to chain-tool for holding a chain wrapped around an object to be squeezed.

The inventon will be described with reference to a chain-wrench, but it is understood that the invention is not to be restricted as such, because it is useful in other applications.

An object of my invention is the provision of a variable chain-receiving opening which may be enlarged or restricted.

Another object of my invention is to permit the chain to be drawn through the chain-receiving opening when it is enlarged, whereby the effective length of the chain wrapped around an object may be adjusted to take-up chain slack.

Another object of my invention is to hold the chain in the chain-receiving opening, when it is restricted, whereby the chain may then be squeeze-drawn about an object.

Another object is to control the enlargement and the restriction of the variable chain-receiving opening by movement of the jaws of the chain tool.

Other objects and a fuller understanding of this invention may be had by referring to the following description and claims, taken in conjunction with the accompanying drawings, in which:

FIGURE 1 is a side elevational view of a chain-tool embodying the features of my invention, the end of the handles being cut-off to fit the drawing paper;

FIGURE 2 is a cross section taken along the line 2—2 of FIGURE 1;

FIGURE 3 is a fragmentary side elevational view, with portions cut-away, to show the variable chain-receiving opening, the view illustrating a position of the jaws at the beginning of the open-position range (maximum opening) and being a position where the chain-receiving opening is of an enlarged dimension to free the chain therein, whereby the chain may be drawn through the chain-receiving opening to take-up slack of the chain wrapped around an object;

FIGURE 4 is a view similar to FIGURE 3, but shows the jaws in a position (intermediate opening) which is at the end of the open-position range and at the beginning of the closed-position range; and FIGURE 5 is a view similar to FIGURE 4, but shows the jaws in a position (minimum opening) which is at the close of the closed-position range.

With reference to the drawings, the invention is shown as being embodied in a chain-wrench, and comprises a pair of handles 10 and 11, pivotally mounted about a pivot member 12. The handles respectively have a pair of first and second jaws 13 and 14 which hold a chain 15 wrapped around an object to be squeezed. In the drawing, the object to be squeezed is illustrated as being a hollow member, such as a pipe 18, but it may be a nut, bolt, or any other turnable member.

The chain 15 comprises a series of links respectively having a head-link portion 16 of maximum width at each end thereof and an intermediate link portion 17 of minimum width extending therebetween. The head-link portions and the intermediate-link portion define a saddle contour.

The jaws 13 and 14 respectively have free-end portions 20 and 21. The free-end portion 21 is connected to a terminal link 22 by means of a pin 23. The free-end portion 20 has a cross-member 24 preferably a pin, spaced at a distance from the pivot member 12. The cross-member 24, upon actuation of the jaws, defines substantially a sweeping arcuate path. The jaws 13 and 14 are movable through an open-position range and a closed-position range.

The jaw 14 has a cam-wall movable relative to the cross-member 24 upon actuation of the jaws. The cam wall comprises a holding surface 26 and a release surface 27 which meet with each other and define a holding-release juncture 28. The holding surface 26 defines a curvature substantially parallel to the sweeping arcuate path of the cross-member 24. The holding surface 26 and the cross-member 24 remain substantially at a fixed distance from each other upon movement of the jaws throughout the closed-position range.

FIGURE 3 shows the jaws at their maximum opening, being the position of the jaws at the beginning of the open-position range. In FIGURE 4, the jaws are in an intermediate position, which is at the end of the open-position range and at the beginning of the closed-position range. In FIGURE 5, the jaws are in their minimum position, which is at the close of the closed-position range.

The cam wall and the cross-member 24, upon actuation of the jaws to a position within the open-position range (FIGURE 3) define a chain receiving opening 30 of an enlarged dimension and being of a width greater than that of a head-link portion 16 to free the chain therein, whereby the head-link portions 16 may be drawn through the chain-receiving opening 30 to take-up slack of the chain wrapped around the pipe 18. The cam wall and the cross-member, upon actuation of the jaws to a position within the closed-position range, restrict the width of the chain-receiving opening to a dimension less than the width of a head-link portion, but more than the width of an intermediate-link portion. In the restricted condition of the chain-receiving opening, the saddle contour of a link is forced to fit against, and to become interlocked with, the cross-member 24 for holding the chain in the chain-receiving opening upon movement of the jaws throughout the closed-position range. The jaws, upon actuation from the position in FIGURE 4 to the position in FIGURE 5, being the closed-position range, squeeze-draw the chain about the object.

In the present invention, the chain-receiving opening may be made to vary in width from an enlarged dimension to free the chain therein to a restricted dimension to hold the chain therein. The enlargement and the restriction of the chain-receiving opening is controlled by the movement of the jaws.

In operation as a chain-wrench, the chain may be wrapped around the object to be turned. The free end of the chain may then be threaded through the chain-receiving opening. The slack in the chain may be taken up by the simple act of pulling the chain through the chain-receiving opening when the jaws are in a position within the open-position range, see FIGURE 3. After the slack is adjusted, the jaws may then be actuated to position within the closed-position range until the chain is tightly squeezed about the object, whereupon the object may be turned by movement of the chain-wrench. In turning the object, the chain-wrench may be operated as a ratchet; that is, the handles may be squeezed tightly, to prevent slippage, when turning the object and squeezed loosely, to allow slippage, when returning the chain-wrench to a fresh starting position.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A chain-tool for holding a chain wrapped around an object to be squeezed, said chain comprising a series of links respectively having a head-link portion of maximum width at each end thereof and an intermediate-link portion of minimum width extending therebetween, said head-link portions and said intermediate-link portion defining a saddle contour, said chain-tool including a pair of first and second jaws pivotally mounted about a pivot member, said jaws respectively having first and second free-end portions, first connection means connecting said first free-end portion to a terminal link of said chain, said second free-end portion having a cross-member spaced at a distance from said pivot member, said cross-member upon actuation of said jaws defining substantially a sweeping arcuate path, said first jaw having a cam-wall movable relative to said cross-member upon actuation of said jaws, said jaws being movable through an open-position range and a closed-position range, said cam-wall and said cross-member upon actuation of said jaws to a position within said open-position range defining a chain-receiving opening therebetween of an enlarged dimension and being of a width greater than that of a head-link portion to free said chain therein, whereby said head-link portions may be drawn through said chain-receiving opening to take-up slack of said chain wrapped around said object, said cam-wall and said cross-member upon actuation of said jaws to a position within said closed-position range restricting the width of said chain-receiving opening to a dimension less than the width of a head-link portion but more than the width of an intermediate-link portion and thereby forcing the saddle contour of a link to fit against and to become interlocked with said cross-member for holding said chain in said restricted chain-receiving opening upon movement of said jaws throughout said closed-position range, said jaws upon further actuation within said closed-position range squeeze-drawing said chain about said object.

2. The structure of claim 1, wherein said cam-wall includes a holding surface and a release surface meeting with each other and defining a holding-release juncture, said holding surface defining a curvature substantially parallel to said sweeping arcuate path.

3. The structure of claim 2, wherein said holding surface and said cross-member remain substantially at a fixed distance from each other upon movement of said jaws throughout said closed-position range.

4. The structure of claim 1, wherein the enlargement and the restriction of said chain-receiving opening is controlled by the movements of said jaws.

5. A chain-tool having variable chain-receiving means for holding a chain, said chain comprising a series of links respectively having a head-link portion of maximum width at each end thereof and an intermediate-link portion of minimum width extending therebetween, said head-link portions and said intermediate-link portion defining a saddle contour, said variable chain receiving means comprising at least first and second opposed members for holding said chain therebetween, actuating means for actuating said opposed members relative to each other to vary the distance therebetween, said members being movable through an open-position range and a closed-position range, said opposed members upon actuation to a position within said open-position range defining a chain-receiving opening therebetween of an enlarged dimension and being of a width greater than that of a head-link portion to free said chain therein, whereby said head-link portions may be drawn through said chain-receiving opening, said opposed members upon actuation to a position within said closed-position range restricting the width of said chain-receiving opening to a dimension less than the width of a head-link portion but more than the width of an intermediate-link portion and thereby forcing the saddle contour of a link to fit against and become interlocked with said first opposed member for holding said chain in said restricted chain-receiving opening.

References Cited

UNITED STATES PATENTS

| | | | |
|---|---|---|---|
| 1,209,049 | 12/1916 | Sheets | 81—68 |
| 1,290,530 | 1/1919 | Evans | 81—67 |
| 2,932,226 | 4/1960 | Seppola | 81—68 X |

JAMES L. JONES, Jr., *Primary Examiner.*